US012614984B2

(12) United States Patent　　　　(10) Patent No.: US 12,614,984 B2
Perrotta et al.　　　　　　　　　　(45) Date of Patent: Apr. 28, 2026

(54) DATA COMMUNICATION FOR GALVANIC ISOLATED DC-DC CONVERTER ON FULLY INTEGRATED ARCHITECTURE WITH CORELESS TRANSFORMER

(71) Applicant: STMicroelectronics International N.V., Geneva (CH)

(72) Inventors: Stefano Perrotta, Nicolosi-Catania (IT); Salvatore Giuseppe Privitera, Paterno (IT); Francesco Pulvirenti, Acireale (IT)

(73) Assignee: STMicroelectronics International N.V., Geneva (CH)

( * ) Notice: Subject to any disclaimer, the term of this patent is extended or adjusted under 35 U.S.C. 154(b) by 343 days.

(21) Appl. No.: 18/225,955

(22) Filed: Jul. 25, 2023

(65) Prior Publication Data

US 2025/0038670 A1　　Jan. 30, 2025

(51) Int. Cl.
　　H02M 3/335　　(2006.01)
　　H02M 1/00　　(2007.01)
(52) U.S. Cl.
　　CPC ..... H02M 3/33523 (2013.01); H02M 1/0012 (2021.05)
(58) Field of Classification Search
　　CPC ........... H02M 1/0012; H02M 3/33523; H02M 3/33576; H02M 3/33584; H02M 3/33592; H03K 17/61; H03K 17/723
　　See application file for complete search history.

(56) References Cited

U.S. PATENT DOCUMENTS 9,948,193 B2　　4/2018　Ragonese et al.
9,985,547 B2　　5/2018　Kikuchi
　　　　　　　(Continued)

FOREIGN PATENT DOCUMENTS

EP　　　　3624317 A1　　3/2020

OTHER PUBLICATIONS

EPO Search Report and Written Opinion for counterpart EP Appl. No. 24188643.1, report dated Dec. 6, 2024, 14 pgs.
　　　　　　　(Continued)

*Primary Examiner* — Thienvu V Tran
*Assistant Examiner* — Lauren Ashley Shaw
(74) *Attorney, Agent, or Firm* — Crowe & Dunlevy LLC

(57)　　　　ABSTRACT
A DC-DC converter includes a primary-side control-circuit having an oscillator driving a transformer in response to assertion of a PWM-signal to transmit power from the primary to the secondary and ceasing in response to deassertion of the PWM-signal, and a receiver demodulator circuit receiving/demodulating a feedback signal sent from the secondary to the primary by comparing an instantaneous value of an envelope indicative of voltages at the primary-coil to an average-value of the envelope to produce a reset-signal. A PWM circuit asserts the PWM-signal in response to a set-signal and deasserts the PWM-signal in response to assertion of the reset-signal. A secondary-side control-circuit rectifies the received power, asserts an intermediate feedback-signal if feedback indicative of the output voltage is greater than a reference-voltage, and connects a capacitance between the secondary and ground in response to assertion of the intermediate feedback-signal to modulate and send the feedback to the primary.

16 Claims, 5 Drawing Sheets

(56) References Cited

U.S. PATENT DOCUMENTS

| | | | |
|---|---|---|---|
| 11,611,280 | B2 | 3/2023 | Parisi et al. |
| 2017/0358993 | A1* | 12/2017 | Ragonese ......... H02M 3/33584 |
| 2018/0205319 | A1 | 7/2018 | Zhuo et al. |
| 2019/0305775 | A1* | 10/2019 | Parisi ................... H03K 17/723 |
| 2021/0203231 | A1 | 7/2021 | Lula et al. |
| 2021/0376735 | A1* | 12/2021 | Parisi ............... H02M 3/33592 |
| 2022/0407427 | A1 | 12/2022 | Flatscher et al. |

OTHER PUBLICATIONS

Ragonese Egidio et al: "A Fully Integrated Galvanically Isolated DC-DC Converter With Data Communication", IEEE Transactions on Circuits and Systems I: Regular Papers, IEEE, US, vol. 65, No. 4, Apr. 1, 2018 (Apr. 1, 2018), pp. 1432-1441, XP011678911.
Analog Devices: "Low Emission, Isolated DC-to-DC Converters," ADuM5020/ADuM5028, Data Sheet, (c) 2018, 20 pgs.
Lombardo et al: "A Fully-Integrated Half-Duplex Data/Power Transfer System With Up to 40Mbps Data Rate, 23mW Output Power and On-Chip 5kV Galvanic Isolation," IEEE International Solid-State Circuits Conference (ISSCC), San Francisco, USA, Feb. 2016, pp. 300-301.
Texas Instruments: "ISOW784x High-Performance, 5000-V(rms) Reinforced Quad-Channel Digital Isolators With Integrated High-Efficiency, Low-Emissions DC-DC Converter," Mar. 2017, 52 pgs.

* cited by examiner

DATA COMMUNICATION FOR GALVANIC ISOLATED DC-DC CONVERTER ON FULLY INTEGRATED ARCHITECTURE WITH CORELESS TRANSFORMER

TECHNICAL FIELD

This disclosure is directed to the field of power transmission across a galvanic isolation and, in particular, to a DC-DC converter for transmitting power across a galvanic isolation while transmitting feedback data back across the galvanic isolation without using an additional communication channel.

BACKGROUND

Current market trends are pushing for integrated solutions in various applications, with DC-DC converters of power less than 1 W being no exception. The driving factors behind this shift include the desire for compactness, cost-effectiveness, and high efficiency. A feature in these converters is galvanic isolation, which aids in isolating electrical systems from each other, reduces the risk of current leakage, and helps prevent electrical faults from damaging the load.

Fully integrated converters that incorporate coreless transformers are now known. These transformers transmit power across a galvanic isolation, offering the advantage of reduction of the size of the system compared to traditional transformers.

Nevertheless, these converters face a persistent challenge in managing the feedback signal, utilized for output voltage regulation, and maintaining high conversion efficiency. The feedback signal allows for adjustments in the driving of the transformer based on the output voltage, thereby optimizing power conversion. Known circuits transmit this feedback signal through dedicated channels on the Printed Circuit Board (PCB) or internally within the System in Package (SiP), but these methods can lead to an increase in size, cost, and could potentially compromise efficiency.

Many of the existing designs for galvanic isolation use separate physical channels for power and signal transmission. These designs often require multiple components, which increases complexity, space requirements, and potentially undermines conversion efficiency. Moreover, using separate channels for power and signal transmission can result in increased electromagnetic interference, adding further complications to the design and operation of the converters.

Given these issues, further development is required to offer solutions that provide for efficient management of the feedback signal.

SUMMARY

A device incorporating a DC-DC converter is disclosed herein. The device includes a transformer with a primary and secondary coil and two distinct control circuits: a primary-side control circuit and a secondary-side control circuit.

The primary-side control circuit incorporates an oscillator, a receiver demodulator circuit, and a pulse width modulation (PWM) circuit. The oscillator is designed to drive the transformer in response to the assertion of a PWM signal, effectively transmitting power from the primary coil to the secondary coil. It also ceases this action upon deassertion of the PWM signal. The receiver demodulator circuit receives and demodulates a feedback signal from the secondary to the primary. This process is accomplished by comparing an instantaneous value of an envelope (which indicates voltages at the primary coil) to the average value of the envelope, subsequently producing a reset signal. Finally, the PWM circuit asserts the PWM signal in response to a set signal and deasserts the same in response to the reset signal assertion.

On the other hand, the secondary-side control circuit rectifies the power received at the secondary to generate an output voltage. It also asserts an intermediate feedback signal if a feedback voltage, indicative of the output voltage, equals or exceeds a reference voltage. The circuit then connects a capacitance between the secondary coil and the ground in response to the assertion of the intermediate feedback signal, modulating and sending the feedback signal from the secondary to the primary side.

The PWM circuit includes a flip flop that assists in generating the PWM signal. Additionally, the receiver demodulator circuit incorporates an envelope detector, a comparator, a combinatorial logic circuit, and filters that helps generate the reset signal. The secondary-side includes a rectifier, a resistor divider, a comparator, a driver, a switch, and a capacitor which is responsible for the modulation.

Also disclosed herein a DC-DC converter that includes a transformer, an oscillator, a receiver demodulator, and a flip flop. The transformer has both a primary coil and a secondary coil, while the oscillator, which is connected to the transformer, is designed to drive the transformer in response to a pulse width modulation (PWM) signal.

The receiver demodulator has a first RC filter coupled between a first terminal of the primary coil and a first input of an envelope circuit, and a second RC filter coupled between a second terminal of the primary coil and a second input of the envelope circuit. The demodulator also includes a third RC filter connected between the envelope circuit output and a first input terminal of a comparator. A switch, controlled by the PWM signal, is linked between the first input terminal of the comparator and an intermediate node. Additionally, a fourth RC filter is connected between the intermediate node and a second input terminal of the comparator. The demodulator has a combinatorial circuit designed to generate a reset signal based on the output from the comparator.

The flip flop in the DC-DC converter has a data input linked to receive an input voltage, a clock input linked to receive a set signal, a reset input connected to receive the reset signal, and an output from which the PWM signal is generated.

The converter may have more specific implementations for the RC filters, the envelope circuit, and the combinatorial circuit. For example, the RC filters could include resistors and capacitors connected in specific ways to terminals of the primary coil and the envelope circuit. The envelope circuit could incorporate a pair of diodes and additional resistors and capacitors. The combinatorial circuit might include a delay circuit, an inverter, and a NAND gate to generate the reset signal.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

In general, this disclosure is directed to the technical field of power conversion and transmission, and to a circuit for efficient direct current to direct current (DC-DC) conversion across a galvanic isolation barrier. Described herein is therefore a DC-DC converter utilizing a coreless transformer that not only transmits power from a primary side circuit to a secondary side circuit but also enables the transmission of feedback signals from the secondary side to the primary side via Amplitude Shift Keying (ASK) modulation without utilizing an additional communication channel, thus reducing area consumption.

Figures 1, 2:
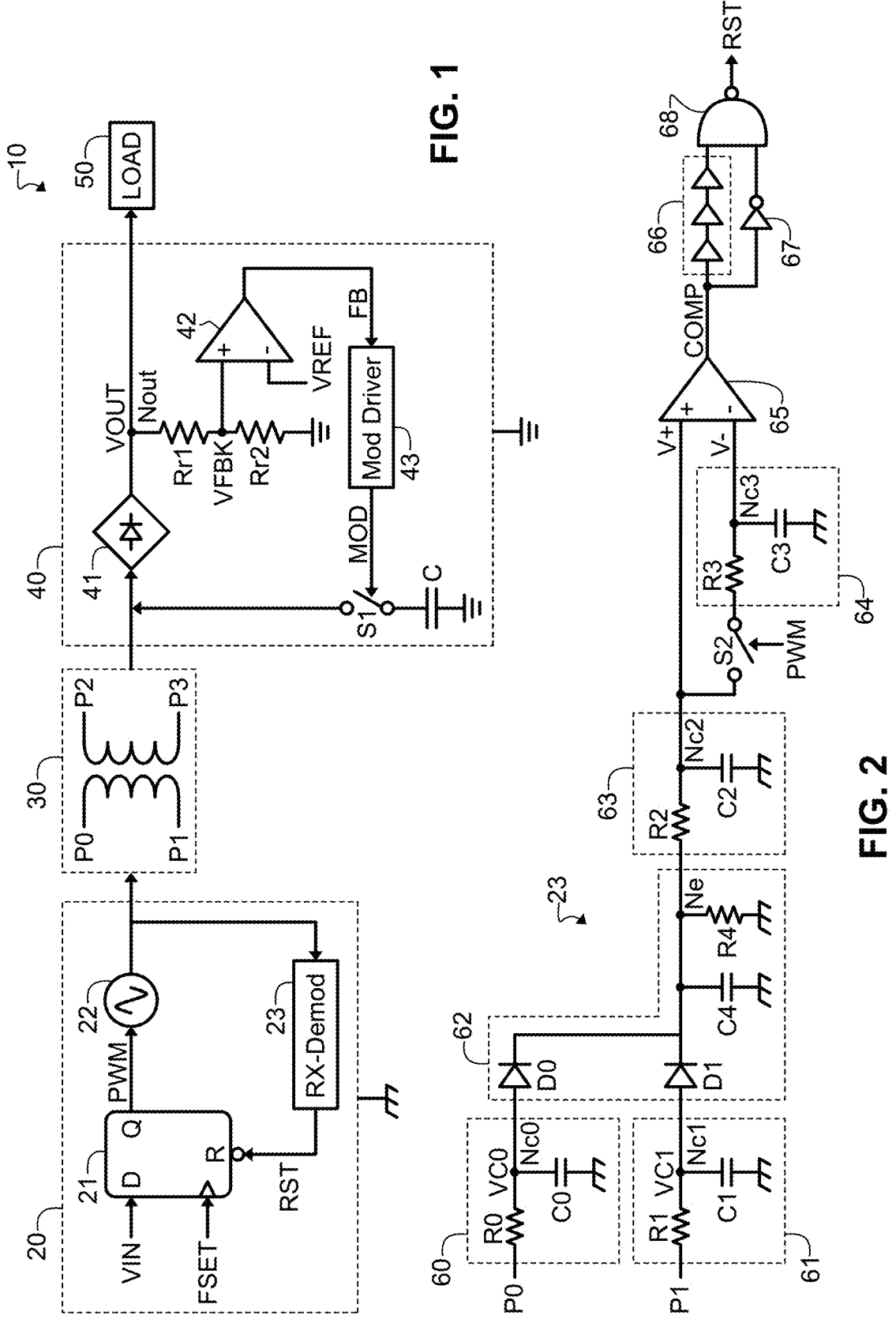
FIG. 1 is a block diagram of a DC-DC converter disclosed herein.
FIG. 2 is a schematic diagram of the receiver demodulator of the DC-DC converter of FIG. 1.

Now described with reference to FIG. 1 is a DC-DC converter 10, which includes a coreless transformer 30. In general, operation of the DC-DC converter 10 proceeds with a primary side circuit 20 (e.g., first integrated circuit) transmitting power to a secondary side circuit 40 (e.g., second integrated circuit) using the transformer 30, and with the secondary side circuit 40 transmitting a feedback signal to the primary side circuit 20 using the transformer 30 via Amplitude Shift Keying (ASK) so that the primary side circuit 20 may modify its driving of the transformer 30 based upon the feedback signal.

In detail, the primary side circuit 20 includes a flip flop 21 that has a data input D connected to an input voltage VIN, a clock input connected to receive a set signal Fset, a reset input R connected to receive a reset signal RST, and an output Q at which a pulse width modulation (PWM) signal is generated. The frequency of the set signal Fset is dependent on loop stability and load capacitance. For example, with a load capacitance of 20 μF, the frequency of the set signal Fset may be 20 KHz. An oscillator 22 drives the primary side of the transformer 30 based upon the PWM signal (e.g., is turned on or off by the PWM signal).

The secondary side circuit 40 is galvanically isolated from the primary side circuit 20 by the transformer 30 and includes a rectifier 41 that rectifies the power produced from the secondary side of the transformer 30 when the primary side of the transformer 30 is driven to thereby generate a rectified output voltage VOUT at an output node Nout. A load 50 is connected to the output node Nout to receive the output voltage VOUT.

When the set signal Fset is asserted to clock the flip flop 21 and the input voltage VIN is at a logic high, the flip flop 21 asserts the PWM signal, causing the oscillator 22 to generate an oscillating signal driving the primary side of the transformer 30 to transmit power to the secondary side of the transformer 30, causing the output voltage VOUT to begin ramping upwardly. The frequency of the oscillating signal that the primary side of the transformer 30 is driven by is set by the design of the oscillator 22 itself, but the duty cycle of the oscillating signal output by the oscillator 22 is set by the reset signal RST as will be described below.

A voltage divider is formed by resistors Rr1 and Rr2 series connected between the output node Nout and ground, with a feedback voltage VFBK therefore being formed at a tap between the resistors Rr1 and Rr2. A comparator 42 receives the feedback voltage VFBK at its non-inverting input terminal and a reference voltage VREF at its inverting input terminal, and asserts a feedback signal FB when the feedback voltage VFBK (representative of the output voltage VOUT) is greater than or equal to the reference voltage VREF, but otherwise deasserts the feedback signal FB.

A modulator driver 43 receives the feedback signal FB as input. When the feedback signal FB is asserted, it closes and opens simultaneously the first switch S1, which is connected between the input of the rectifier 41 and a capacitor C. If the feedback signal FB is not asserted, the first switch S1 remains open.

Closing the first switch S1 to connect the capacitor C between the input of the rectifier 41 and ground has the effect of reducing the voltage across the primary side of the transformer 30 by an amount proportional to the capacitance of the capacitor C (e.g., modulating the amplitude of the voltage across the primary side of the transformer 30 to perform amplitude shift keying modulation). This modulation is repeatedly performed by the modulator driver 43 at a frequency dependent on the frequency of the carrier—for example, with the frequency of driving of the primary of the transformer 30 being at 20 MHz and the modulator driver 43 driving the switch S1 at a frequency of 800 kHz. In general, the following mathematical relationship between the modulation frequency used by the modulator driver 43 and the carrier frequency is followed:

$$F_{modulating} = \frac{F_{carrier}}{20}$$

This relationship is set such that $F_{carrier}$ and $F_{modulating}$ are sufficiently far apart to facilitate carrier filtration during demodulation.

A receiver demodulator 23 in the primary side circuit 20 monitors the voltage across the primary side of the transformer 30 and asserts the reset signal RST to thereby cause deassertion of the PWM signal by the flip flop 21 in response to the modulation of the voltage across the primary side of the transformer 30 indicating that the feedback signal FB has been asserted, thereby ceasing upward ramping of the output voltage VOUT.

Further details will be given with reference to FIG. 2, showing the details of the receiver demodulator 23. The primary side of the transformer 30 is connected between nodes P0 and P1. A first RC filter 60 is connected between node P0 and node Nc0. The first RC filter 60 includes a resistor R0 connected between node P0 and node Nc0 and a capacitor C0 connected between node Nc0 and ground, with a first filtered voltage VC0 being formed across capacitor C0 dependent on the voltage at node P0. A second RC filter 61 is connected between node P1 and node Nc1. The second RC filter 61 includes a resistor R1 connected between node P1 and node Nc1 and a capacitor C1 connected between node Nc1 and ground, with a second filtered voltage VC1 being formed across capacitor C1 dependent on the voltage formed at node P1.

Figure 3:
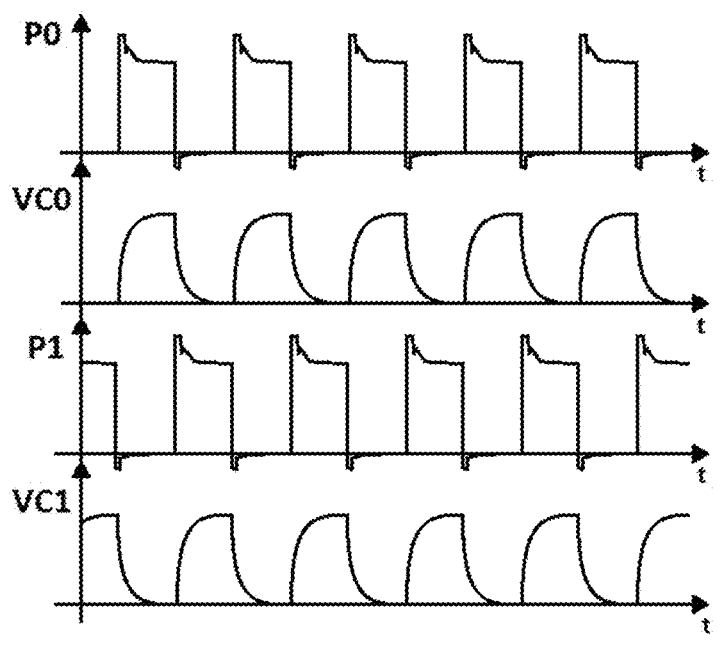
FIG. 3 includes graphs showing the voltages at nodes P0 and P1 and the filtered versions VC0 and VC1 of those voltages.

Refer to FIG. 3, where the effect of the RC filter 60 upon the voltage at P0 to produce the filtered voltage VC0, and the effect of the RC filter 61 upon the voltage at P1 (which is 180° out of phase with the voltage V0) to produce the filtered voltage VC1, can be observed.

An envelope detector 62 is connected between nodes Nc0/Nc1 and Ne. In particular, the envelope detector 62 includes diode D0 having its anode connected to node Nc0 and its cathode connected to node Ne, diode D1 having its anode connected to node Nc1 and its cathode connected to node Ne, capacitor C4 connected between node Ne and ground, and resistor R4 connected between node Ne and ground.

Figure 4:
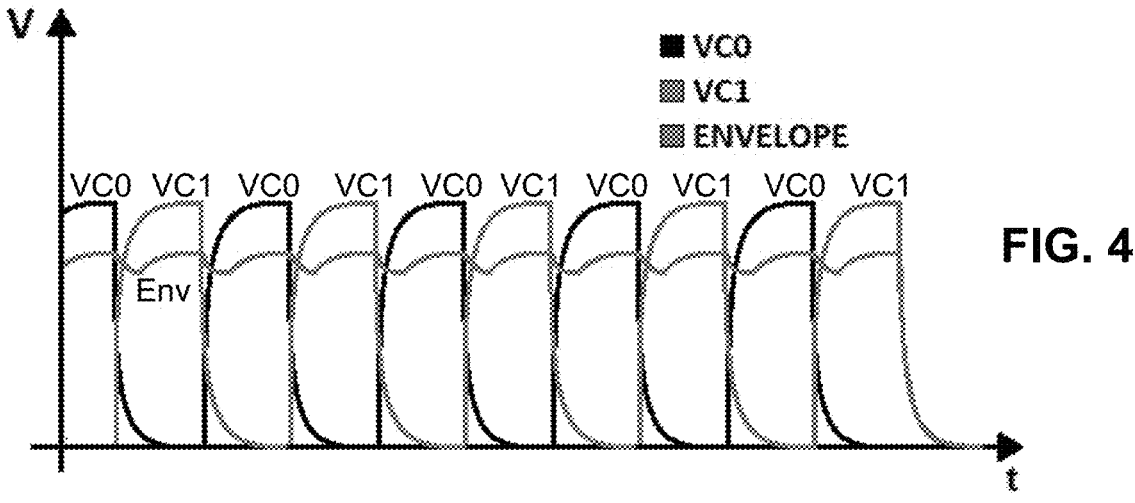
FIG. 4 is a graph showing the envelope of the voltages VC0 and VC1 generated by the envelope detector of FIG. 2.

The output of the envelope detector 62 at node Ne is the envelope of the voltages VC0 and VC1, as shown in FIG. 4. In greater detail, envelope is a signal charged to the peak value of VC0 or VC1 less the drop across the diode D0 or D1.

A third RC filter 63 is connected between node Ne and Nc2. The third RC filter 63 includes a resistor R2 connected between nodes Ne and Nc2 and a capacitor C2 connected between node Nc2 and ground, with a third filtered voltage V+ being formed across the capacitor C2. A fourth RC filter 64 is switchingly connected between nodes Nc2 and Nc3 by switch S2 which is operated by the PWM signal, and together with S2 forms a sample/hold circuit. The fourth RC filter 64 includes a resistor R3 connected between switch S2 and node Nc3 and a capacitor C3 connected between node Nc3 and ground, with a fourth filtered voltage V− being formed across capacitor C3. The time constant T3 of the fourth RC filter 64 is greater than the time constant T2 of the third RC filter 63, for example T3 being 100×T2.

Figure 5:
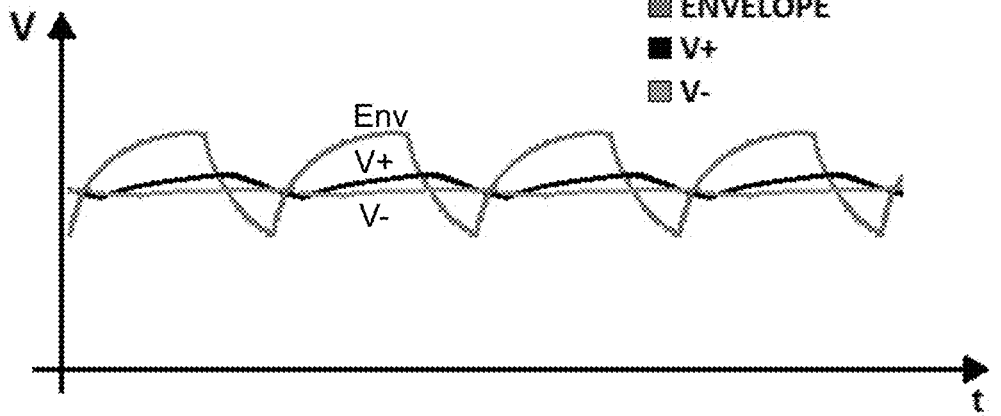
FIG. 5 is a graph showing the envelope of voltages VC0 and VC1 generated by the envelope detector of FIG. 2 as compared to the V+ and V− voltages.

A comparator 65 has its non-inverting input coupled to node Nc2 to receive voltage V+ (the envelope after filtering by RC filter 63) and its inverting input coupled to node Nc3 to receive voltage V− (the average of V+, produced by RC filter 64). The voltage V+ and the voltage V− (when switch S2 is closed) are shown as compared to the envelope produced by envelope detector 62 in FIG. 5.

Figure 6:
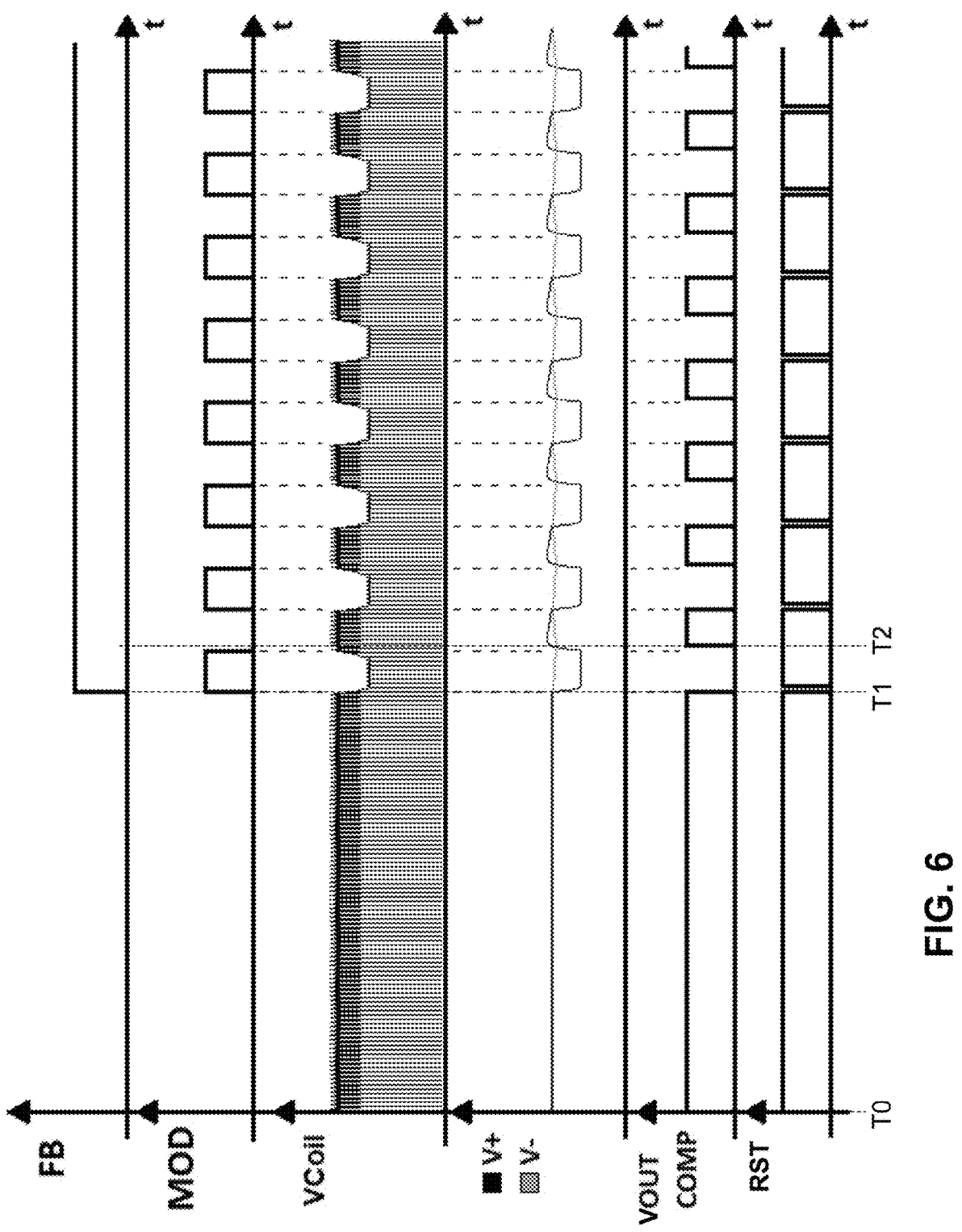
FIG. 6 is a timing diagram showing operation of the DC-DC converter of FIG. 1 in an open loop configuration.

The operation of the receiver demodulator 23 will be given. First, however, refer to FIG. 6, showing, between times T0 and T1, a hypothetical open-loop operating case where the DC-DC converter 10 is operating at a steady state where the oscillator 22 is driving the transformer 30, but the reset signal RST is ignored by the flip flop 21. Observe that the output COMP of the comparator 65 remains a logic high between times T0 and T1 because the voltages V+ and V− are generally equal. At time T1, the feedback voltage VFBK becomes greater than the reference voltage VREF, and the feedback signal FB is correspondingly asserted by the comparator 42. As a result of this, the modulator driver 43 asserts the MOD signal, closing switch S1, causing a modulation (lowering) of the voltage Vcoil across the transformer 30 between times T1 and T2. As a result of this, the voltage V+ becomes less than the voltage V−, causing the output COMP of the comparator 65 to briefly transition to a logic low. The delay line 66, inverter 67, and NAND gate 68 form a pulse generator acting on the falling edge of the COMP signal.

In this hypothetical operating instance, as stated, the flip flop 21 ignores the reset signal RST, so the output voltage VOUT is not altered.

Figure 7:
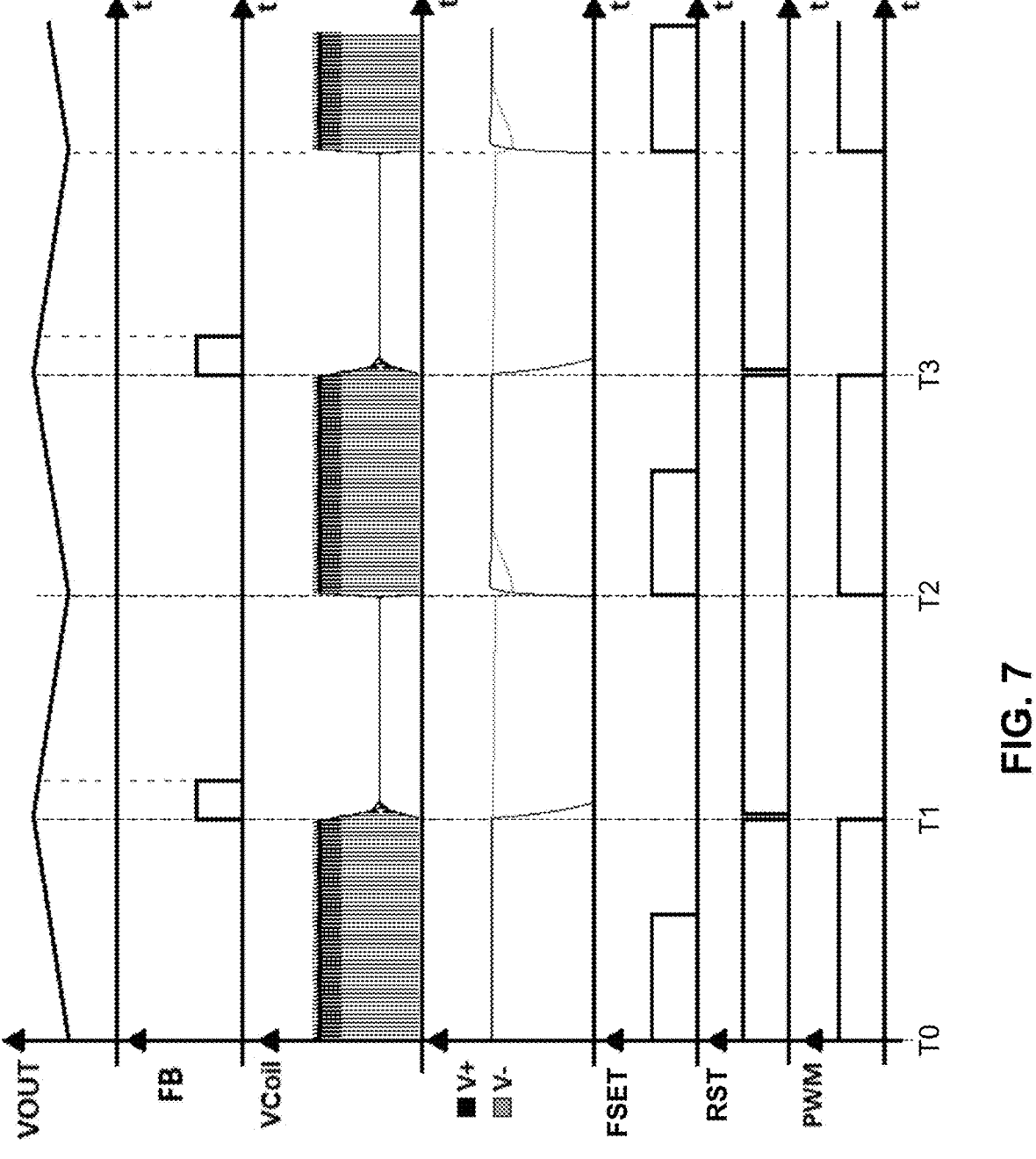
FIG. 7 is a timing diagram showing operation of the DC-DC converter of FIG. 1 in a closed loop configuration.

Turn now to FIG. 7, illustrating a standard operating mode in which the reset signal RST is not ignored. Observe between times T0 and T1 where the oscillator 22 is driving the transformer 30, and as a result, the output voltage VOUT ramps upwardly. At time T1 the feedback voltage VFBK becomes greater than the reference voltage VREF, and the feedback signal FB is correspondingly asserted by the comparator 42. As a result of this, the modulator driver 43 asserts the MOD signal, closing switch S1, causing a modulation (lowering) of the voltage Vcoil across the transformer 30 at time T1.

As a result of this drop in Vcoil at time T1, the voltage V+ at the non-inverting input terminal of the comparator 65 falls substantially below the voltage V− at the inverting input terminal of the comparator 65. This correspondingly results in the reset signal RST at the output of the NAND gate 68 transitioning to a logic low at time T1, resetting the flip flop 21, causing the PWM signal to transition low. The PWM signal transitioning low opens switch S2, with the voltage V− being maintained by the capacitor C3 while the voltage V+ drops. As another result of the PWM signal transitioning low, the oscillator 22 stops driving the transformer 30, and the output voltage VOUT begins to ramp downwardly between times T1 and T2.

When the next pulse of FSET arrives at time T2, the flip flop 21 reasserts the PWM signal, closing switch S2, causing the oscillator 22 to again drive the transformer 30, causing the output voltage VOUT to ramp upwardly again and operation between times T2 and T3 proceeds as with operation between time T0 and T1. Note that upon restart at time T2 due to arrival of the next pulse of FSET, the voltage V+ will exceed V− (since the instantaneous value of V+ can rise at a quicker rate than its average), causing the comparator 65 to assert its output COMP; this is a necessary condition because the logic of the RST signal works on the falling edge of the comparison output COMP—this condition likewise occurs at startup.

As can be appreciated, due to power transfer at a fixed frequency, this DC-DC converter 10 provides for high efficiency power transfer across a galvanic isolation. In addition, due to the use of ASK for providing the feedback, which is demodulated by the specifically designed receiver demodulator 23, little additional area is consumed to provide for the feedback channel back across the galvanic isolation. Still further, the comparison of the envelope with its own average makes the design robust against variations due to process spread, temperature variation, etc.

Figure 8:
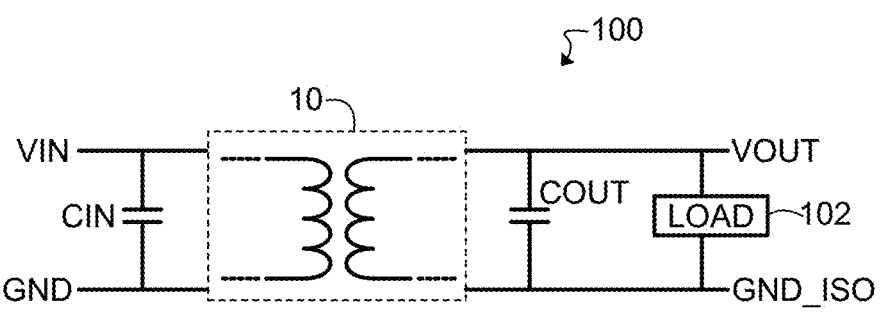
FIG. 8 is a block diagram of a fully isolated DC-DC supply converter circuit formed using the DC-DC converter of FIG. 1.

The DC-DC converter 10 may be used in a variety of applications. For example, as shown in FIG. 8, the DC-DC converter 10 may be used in an isolated DC-DC supply converter circuit 100, where the DC-DC converter 100 receives the input voltage VIN formed across a capacitor CIN coupled between the input and a first ground GND, and provides the output voltage VOUT across a capacitor COUT coupled between the output and a second ground GND_ISO that is isolated form the first ground GND.

Figure 9:
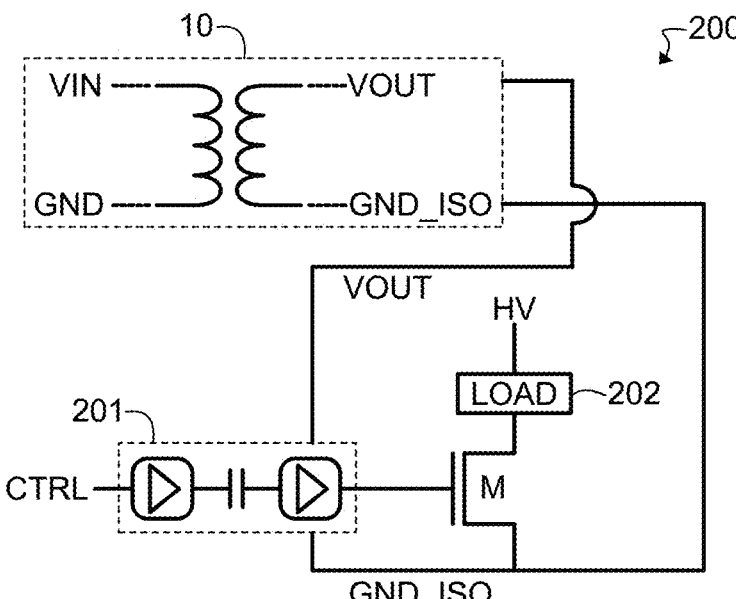
FIG. 9 is a block diagram of a power supply circuit formed using the DC-DC converter of FIG. 1.

Likewise, the DC-DC converter 10 may be used as a power supply for gate driver 201 as shown in FIG. 9. Here, a power transistor M is coupled between a load 202 and the isolated ground GND_ISO to thereby sink power from a high voltage node HV through the load 202. The power transistor M has its gate terminal driven by the gate driver circuit 201, which receives a control signal CTRL as input. The gate driver circuit 201 is powered between the output voltage VOUT generated by the DC-DC converter and the isolated ground GND_ISO.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A device comprising a DC-DC converter, wherein the DC-DC converter comprises:
    a transformer having a primary coil and a secondary coil;
    a primary-side control circuit comprising:
        an oscillator configured to drive the transformer in response to assertion of a pulse width modulation (PWM) signal to thereby transmit power from the primary coil to the secondary coil, and to cease driving the transformer in response to deassertion of the PWM signal;
        a receiver demodulator circuit configured to receive and demodulate a feedback signal sent from the secondary coil to the primary coil by comparing an instantaneous value of an envelope indicative of voltages at the primary coil to an average value of the envelope to thereby produce a reset signal; and
        a PWM circuit configured to assert the PWM signal in response to a set signal and deassert the PWM signal in response to assertion of the reset signal; and
    a secondary-side control circuit configured to:
        rectify the power received at the secondary coil to generate an output voltage;
        assert an intermediate feedback signal if a feedback voltage indicative of the output voltage is greater than or equal to a reference voltage; and
        connect a capacitance between the secondary coil and ground in response to assertion of the intermediate feedback signal to thereby modulate and send the feedback signal from the secondary-side control circuit to the primary-side.

2. The device of claim 1, wherein the PWM circuit comprises a flip flop having a data input coupled to receive an input voltage, a clock input coupled to receive the set signal, a reset input coupled to receive the reset signal, and an output at which the PWM signal is generated.

3. The device of claim 1, wherein the receiver demodulator circuit comprises:
    an envelope detector configured to generate the envelope indicative of the voltages at the primary coil;
    a comparator configured to compare an instantaneous value of the envelope to an average value of the envelope; and a combinatorial logic circuit configured to generate the reset signal based upon output from the comparator.

4. The device of claim 3,
    wherein the comparator includes a first input coupled to receive the instantaneous value of the envelope, a second input coupled to receive the average of the envelope, and an output coupled to the combinatorial logic circuit; and
    wherein the receiver demodulator circuit further comprises an averaging circuit configured to generate the average of the envelope, the averaging circuit comprising: a capacitor coupled to the second input of the comparator; a switch configured to couple the envelope to the second input of the comparator in response to assertion of the PWM signal and decouple the envelope from the second input of the comparator in response to deassertion of the PWM signal.

5. The device of claim 4, wherein the receiver demodulator circuit further comprises:
    a first filter coupled between a first terminal of the primary coil and a first input of the envelope detector; and
    a second filter coupled between a second terminal of the primary coil and a second input of the envelope detector.

6. The device of claim 5, wherein the receiver demodulator circuit further comprises; a third filter coupled between the envelope detector and the first input of the comparator.

7. The device of claim 6, wherein the receiver demodulator circuit further comprises a resistor coupled between the switch and the second input of the comparator.

8. The device of claim 7, wherein the combinatorial logic circuit comprises:
    a delay circuit configured to delay the output of the comparator;
    an inverter configured to invert the output of the comparator; and
    a NAND gate configured to perform a logic NAND operation on the delayed output of the comparator and the inverted output of the comparator to thereby generate the reset signal.

9. The device of claim 1, wherein the secondary-side control circuit comprises:
    a rectifier configured to rectify the power received at the secondary coil to generate an output voltage at an output node;
    a resistor divider coupled between the output node and ground, with the feedback voltage being generated at a tap of the resistor divider;
    a comparator configured to assert an intermediate feedback signal if the feedback voltage is greater than or equal to the reference voltage;
    a driver configured to assert a control signal in response to assertion of the intermediate feedback signal; and
    a switch configured to connect a capacitance between the secondary coil and the ground in response to assertion of the control signal to thereby modulate and send the feedback signal from the secondary coil to the primary coil.

10. The device of claim 1, wherein the DC-DC converter is configured to be used to power a gate driver that generates a gate drive signal for a gate of a power transistor that powers a load.

11. A DC-DC converter, comprising:
    a transformer having a primary coil and a secondary coil;
    an oscillator coupled to the transformer and configured to drive the transformer in response to a pulse width modulation (PWM) signal;

a receiver demodulator comprising:

a first resistor-capacitor (RC) filter coupled between a first terminal of the primary coil and a first input of an envelope circuit;

a second RC filter coupled between a second terminal of the primary coil and a second input of the envelope circuit;

a third RC filter coupled between the output of the envelope circuit and a first input terminal of a comparator;

a switch coupled between the first input terminal of the comparator and an intermediate node, the switch being controlled by the PWM signal;

a fourth RC filter coupled between the intermediate node and a second input terminal of the comparator; and a combinatorial circuit configured to generate a reset signal based upon output from the comparator; and a flip flop having a data input coupled to receive an input voltage, a clock input coupled to receive a set signal, a reset input coupled to receive the reset signal, and an output at which the PWM signal is generated.

12. The DC-DC converter of claim 11, wherein the first RC filter comprises a first resistor connected between the first terminal of the primary coil and the first input of the envelope circuit and a first capacitor connected between the first input of the envelope circuit and ground; and wherein the second RC filter comprises a second resistor connected between the second terminal of the primary coil and the second input of the envelope circuit and a second capacitor connected between the second input of the envelope circuit and ground.

13. The DC-DC converter of claim 12, wherein the envelope circuit comprises:

a first diode having an anode connected to the first resistor;

a second diode having an anode connected to the second resistor;

wherein cathodes of the first and second diodes are connected to one another;

a fifth capacitor connected between the cathodes of the first and second diodes and ground; and a fifth resistor connected between the cathodes of the first and second diodes and ground.

14. The DC-DC converter of claim 13, wherein the third RC filter comprises:

a third resistor connected between the cathodes of the first and second diodes and the first input terminal of the comparator; and a third capacitor connected between the first input terminal of the comparator and ground.

15. The DC-DC converter of claim 14, wherein the fourth RC filter comprises:

a fourth resistor connected between the switch and the second input terminal of the comparator; and a fourth capacitor connected between the second input terminal of the comparator and ground.

16. The DC-DC converter of claim 15, wherein the combinatorial circuit comprises:

a delay circuit configured to delay the output of the comparator;

an inverter configured to invert the output of the comparator; and a NAND gate configured to perform a logic NAND operation on the delayed output of the comparator and the inverted output of the comparator to thereby generate the reset signal.

\* \* \* \* \*